United States Patent
Kuang et al.

(10) Patent No.: US 12,360,352 B2
(45) Date of Patent: Jul. 15, 2025

(54) PHASE-MODULATED FLUORESCENCE DIFFERENTIAL MICROSCOPIC IMAGING METHOD AND DEVICE BASED ON ELECTRO-OPTICAL TECHNOLOGY

(71) Applicant: ZHEJIANG UNIVERSITY, Hangzhou (CN)

(72) Inventors: Cuifang Kuang, Hangzhou (CN); Xu Liu, Hangzhou (CN); Wanjie Dong, Hangzhou (CN); Shaocong Liu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 333 days.

(21) Appl. No.: 18/022,207

(22) PCT Filed: Oct. 29, 2021

(86) PCT No.: PCT/CN2021/127388
§ 371 (c)(1),
(2) Date: Feb. 20, 2023

(87) PCT Pub. No.: WO2022/089578
PCT Pub. Date: May 5, 2022

(65) Prior Publication Data
US 2023/0305280 A1     Sep. 28, 2023

(30) Foreign Application Priority Data
Oct. 31, 2020 (CN) .......................... 202011198799.1

(51) Int. Cl.
*G02B 21/00* (2006.01)
*G01N 21/64* (2006.01)

(52) U.S. Cl.
CPC ..... *G02B 21/0076* (2013.01); *G01N 21/6458* (2013.01); *G02B 21/0032* (2013.01)

(58) Field of Classification Search
CPC ............ G02B 21/0076; G02B 21/0032; G01N 21/6458
See application file for complete search history.

(56) References Cited

U.S. PATENT DOCUMENTS

2020/0310095 A1 * 10/2020 Netz ................. G02B 21/0068

FOREIGN PATENT DOCUMENTS

| CA | 2854675 A1 * | 5/2013 | ......... G01N 21/6458 |
| CN | 107389631 B * | 7/2020 | ......... G01N 21/6456 |

\* cited by examiner

*Primary Examiner* — David P Porta
*Assistant Examiner* — Fani Polyzos Boosalis
(74) *Attorney, Agent, or Firm* — Jiwen Chen; Joywin IP Law PLLC (57) ABSTRACT

Disclosed is a phase-modulated fluorescence differential microscopic imaging device based on electro-optical modulation technology, including an illumination system for generating an excitation beam, a detection system for collecting a fluorescent signal emitted by a sample, and a computer for controlling and signal processing. The illumination system includes the following components that are sequentially arranged: a laser, emitting a laser beam; an electro-optical modulation module, configured to control a rapid conversion of the laser beam between a right-handed circularly polarized light and a left-handed circularly polarized light; and a phase modulation device, configured to modulate a circularly polarized light to form a solid light spot and a hollow light spot for illuminating the sample and exciting fluorescence. Also disclosed is a phase-modulated fluorescence differential microscopic imaging method based on the electro-optical modulation technology, which realizes a rapid conversion of a solid light spot and a hollow light spot, and improves the imaging speed of the fluorescence differential microscopic imaging system to a large extent.

10 Claims, 4 Drawing Sheets

PHASE-MODULATED FLUORESCENCE DIFFERENTIAL MICROSCOPIC IMAGING METHOD AND DEVICE BASED ON ELECTRO-OPTICAL TECHNOLOGY

This is a U.S. national stage application of PCT Application No. PCT/CN2021/127388 under 35 U.S.C. 371, filed Oct. 29, 2021 in Chinese, claiming priority of Chinese Application No. 202011198799.1, filed Oct. 31, 2020, all of which are hereby incorporated by reference.

TECHNICAL FIELD

The present invention belongs to the field of confocal microscopic imaging, and particularly relates to a method and a device for realizing rapid phase-modulated fluorescence differential microscopic imaging based on electro-optical modulation technology.

BACKGROUND TECHNOLOGY

Conventional far-field fluorescence microscopy technology is limited by diffraction limit, thus the resolution that can be achieved thereby is always difficult to be lower than half of the wavelength, so its application in biomedicine, nanotechnology, materials, and other fields is greatly limited. In order to break through such a limit, relevant researchers have proposed many super-resolution microscopy technologies since the 1990s, such as stimulated emission depletion (STED) super-resolution microscopy, single-molecule localization super-resolution (SMS) microscopy, etc. Among these super-resolution microscopy technologies, fluorescence emission difference (FED) microscopy is a recently proposed super-resolution microscopic technology, which is based on confocal microscopy imaging technology where two images are obtained by scanning a sample to be tested with two specific excitation spots, and the image resolution is improved by differential processing of the two images. The experiment proves that the fluorescence differential microscopic imaging technology can achieve a resolution of less than a quarter of the wavelength in the far field, and has a high signal-to-noise ratio. In addition, since there is no need for high-power illumination light, light bleaching and light damage can be greatly reduced.

However, fluorescence differential microscopy is limited in imaging speed to image moving samples with high temporal resolution requirements, and motion artifacts may occur during imaging. In the fluorescence differential microscopic imaging system, a 0-to-$2\pi$ vortex phase plate or a spatial light modulator loaded with the same 0-to-$2\pi$ vortex phase modulation pattern is generally used to modulate a circularly polarized light in the same direction, so as to obtain a required hollow light spot, such as the technical solutions disclosed in application documents with publication numbers of CN 110118726 A and CN 105510290 A. In the imaging process, since the sample to be tested is needed to be scanned with a solid light spot and a hollow light spot respectively: When the vortex phase plate is used for the phase modulation, the beam needs to be divided into two paths with a splitter prism, where one path is modulated into the hollow light spot through the vortex phase plate, and the other path is the solid light spot without being phase-modulated, this will increase the complexity of the system to a certain extent and improve the difficulty for system adjustment. When the spatial light modulator is used for the phase modulation, the conversion between the solid light spot and the hollow light spot is usually achieved by changing the phase modulation pattern loaded on the surface of the spatial light modulator. Since the response time of the spatial light modulator is limited, and in addition, it takes time to use a software program to control the conversion of the phase modulation pattern loaded by the spatial light modulator between the vortex phase modulation pattern and the non-phase modulation pattern from 0 to $2\pi$, resulting in that it takes a certain time to realize the conversion between the solid light spot and the hollow light spot, and it takes a relatively long time to scan the sample to be observed with the solid light spot and the hollow light spot respectively, and there will be motion artifacts, thus limiting the imaging speed of fluorescence differential microscopic imaging technology and the observation of moving sample to be measured. In order to improve the imaging speed of this technology, the key to solving the problem is to reduce the time required for the conversion between the solid light spot and the hollow light spot.

SUMMARY OF INVENTION

A phase-modulated fluorescence differential microscopic imaging device based on electro-optical modulation technology is provided in the present invention. The device has a compact and simple structure and can be retrofitted based on an ordinary fluorescence differential microscopic imaging system. The device realizes a rapid conversion between a solid light spot and a hollow light spot, which greatly improves the imaging speed of the fluorescence differential microscopic imaging system.

Figure 1:
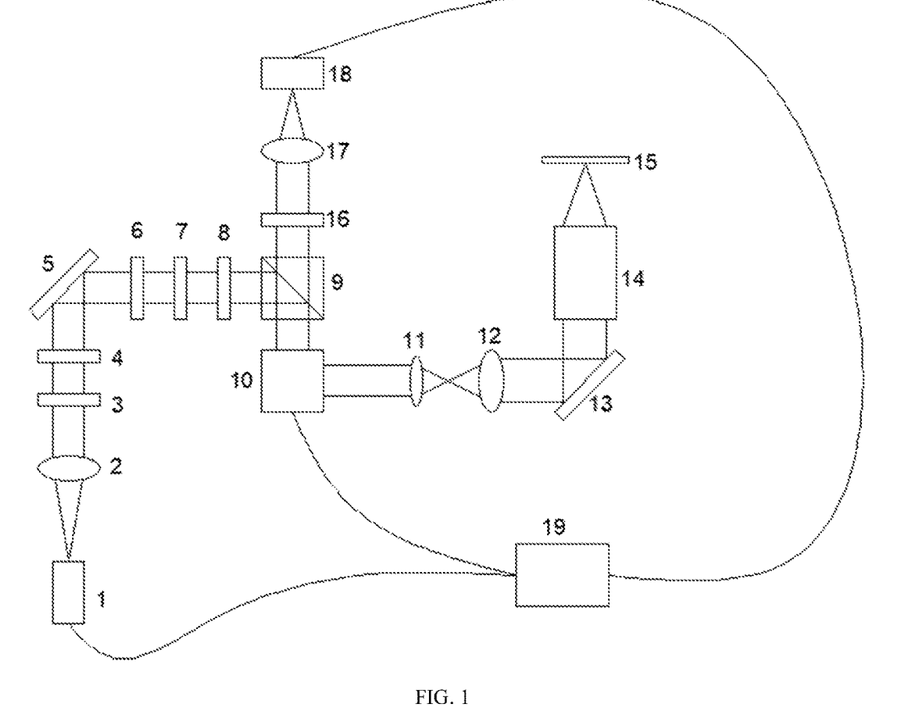
FIG. 1 is a schematic diagram of a conventional fluorescent differential microscopic imaging system based on a confocal imaging system and galvanometer scanning, with a 0-to-2π vortex phase plate 6 used as a phase modulator.
Figure 2:
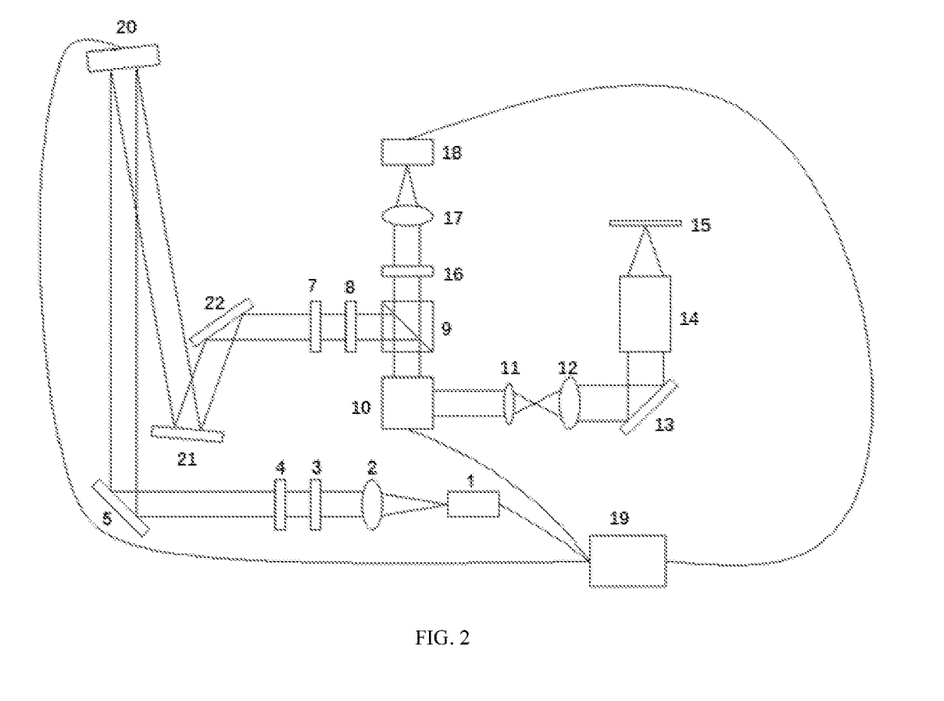
FIG. 2 is a schematic diagram of a conventional fluorescent differential microscopic imaging system based on a confocal imaging system and galvanometer scanning, with a spatial light modulator 20 used as a phase modulator.

On the basis of a conventional fluorescence differential microscopic imaging system (FIG. 1 and FIG. 2), the present invention proposes to use electro-optical modulation technology to realize the change of the polarization state of illumination light. Since the circularly polarized light with different rotation directions varies in its distribution after the same 0-to-$2\pi$ vortex phase modulation, i.e., a solid light spot and a hollow light spot respectively, and since the electro-optical modulator has a high response speed with the maximum operating frequency being up to 100 MHz, high-speed conversion between solid and hollow light spots can be achieved, thus reducing the time required for system imaging, and further improving the speed of fluorescence differential microscopic imaging.

A phase-modulated fluorescence differential microscopic imaging device based on electro-optical modulation technology, including an illumination system for generating an excitation beam, a detection system for collecting a fluorescent signal emitted by a sample, and a computer for controlling and signal processing, where the illumination system comprises the following components that are sequentially arranged:

a laser, emitting a laser beam;

an electro-optical modulation module, configured to control a rapid conversion of the laser beam between a right-handed circularly polarized light and a left-handed circularly polarized light; and a phase modulation device, configured to phase-modulate a circularly polarized light to form a solid light spot and a hollow light spot for illuminating the sample and exciting fluorescence.

Preferably, the electro-optical modulation module includes an electro-optical modulator for modulating a polarization state of an excitation light and a high-voltage driving module for controlling the electro-optical modulator, and the high-voltage driving module is controlled by the computer.

Preferably, a polarizing plate for adjusting the excitation light to make an angle of 45° with the direction of a crystal optical axis of the electro-optical modulator and a ¼ wave plate for modulating an amplitude state of the excitation light are provided between the laser and the electro-optical modulation module, and the adjusted laser beam is a right-handed circularly polarized light.

Preferably, in case that a beam passes through the electro-optical modulator, the polarization state of the beam does not change when the electro-optical modulator does not apply a control voltage, and the beam is converted into a left-handed circularly polarized light when the electro-optical modulator applies a voltage equal to a half wave voltage $V_\pi$ of the electro-optical modulator, and the rapid conversion of the beam between right-handed circularly polarized light and left-handed circularly polarized light is capable of being achieved by applying a high-frequency pulse voltage $V_\pi$ with a certain interval.

Preferably, the phase modulation device is a vortex phase plate with a length of 0 to $2\pi$.

Parallel preferably, the phase modulation device is a spatial light modulator loaded with a 0-to-$2\pi$ vortex phase modulation pattern.

In the device of the present invention, the illumination system includes the following components that are sequentially arranged:
- a laser being used as a light source, emitting a laser beam;
- a polarization maintaining fiber, configured to keep a polarization direction output by the laser unchanged;
- a collimating mirror, configured to collimate and expand a laser light source outputted by a single mode of the polarization maintaining fiber;
- a polarizing plate, configured to adjust an excitation light to make an angle of 45° with the direction of a crystal optical axis of an electro-optical modulator and a ¼ wave plate, configured to modulate an amplitude state of the excitation light;
- an electro-optical modulator, configured to modulate the polarization state of the excitation light, and a high voltage driving module, configured to control the electro-optical modulator;
- a vortex phase modulation module, configured to achieve 0-to-$2\pi$ phase modulation;
- a reflective mirror, configured to adjust a laser light path to make the light path compact;
- an ½ wave plate, configured to adjust a laser polarization direction;
- an ¼ wave plate, configured to adjust a laser phase so that a phase-modulated incident light becomes a circularly polarized light;
- a dichroscope, configured to adjust reflect the excitation light and transmit fluorescence;
- a galvanometer system, configured to achieve scanning of a sample;
- a 4f system, configured to achieve laser beam expansion and point scanning, including a scanning mirror and a field mirror; and
- an objective lens, configured to focus the excitation light and collect fluorescence.

Specifically, the detection system for collecting a fluorescent signal from the sample includes:
- a filtering plate, configured to filter the light reflected from a sample surface, so that only the fluorescence emitted by a fluorescent sample passes through the filter plate involved in imaging;
- a lens, configured to converge the fluorescence emitted by the fluorescent sample onto a detector array; and
- a detector array, composed of a plurality of photodetectors, configured to convert a detected light signal into an electrical signal and transmit the electrical signal to a computer.

Besides, the computer is also configured to control the laser light source, the electro-optical modulator, the phase modulator, the galvanometer system, and the detection array.

Based on the above-mentioned device, the present application also provides a phase modulated fluorescence differential microscopic imaging method based on electro-optical modulation technology, including:
- adjusting a laser beam emitted by a laser to a right-handed circularly polarized light after collimating the laser beam;
- controlling a rapid conversion of the laser beam between a right-handed circularly polarized light and a left-handed circularly polarized light through an electro-optical modulation module;
- phase-modulating a circularly polarized light to form a solid light spot and a hollow light spot for illuminating a sample and exciting fluorescence; and
- collecting a fluorescent signal to obtain images of the solid light spot and the hollow light spot respectively, and obtaining a microscopic imaging result after differential processing.

Preferably, the electro-optical modulation module includes an electro-optical modulator for modulating a polarization state of an excitation light and a high-voltage driving module for controlling the electro-optical modulator, and the high-voltage driving module is controlled by the computer.

Preferably, in case that a beam passes through the electro-optical modulator, the polarization state of the beam does not change when the electro-optical modulator does not apply a control voltage, and the beam is converted into a left-handed circularly polarized light when the electro-optical modulator applies a voltage equal to a half wave voltage $V_\pi$ of the electro-optical modulator, and the rapid conversion of the beam between right-handed circularly polarized light and left-handed circularly polarized light is capable of being achieved by applying a high-frequency pulse voltage $V_\pi$ with a certain interval.

Preferably, the phase modulation device is used to phase-modulate the circularly polarized light, and the phase modulation device is a 0-to-$2\pi$ vortex phase plate or a spatial light modulator loaded with a 0-to-$2\pi$ vortex phase modulation pattern.

The principle of the present invention is as follows.

In the present invention, on the basis of a conventional fluorescent differential microscopic imaging system, after collimation and beam expansion, the laser is first adjusted to a linearly polarized light through a polarizing plate whose polarization direction makes an angle of 45° with the direction of a crystal optical axis of the electro-optical modulator, and then the linearly polarized light is adjusted to a right-handed circularly polarized light through a ¼ wave plate whose optical axis direction is consistent with the modulation direction of the electro-optical modulator, and the right-handed circularly polarized light enters the electro-optical modulator. Under the control of the electro-optical modulator, the laser realizes rapid conversion between right-handed circularly polarized light and left-handed circularly polarized light. After being modulated by the 0-to-$2\pi$ vortex phase plate, the laser is modulated to obtain a hollow light spot and a solid light spot respectively according to whether the laser is in the same rotation direction as the vortex phase plate. The samples are scanned with the solid light spot and the hollow light spot respectively, and the imaging results obtained are subtracted according to a certain proportion to obtain a fluorescence differential microscopic imaging result.

Working principle of the electro-optical modulator is an electro-optical effect, that is, the phenomenon that the refractive index of an electro-optical material changes under the action of a direct current electric field or an alternating current electric field. For an anisotropic electro-optical material, the electric field will affect the refractive index distribution of the material in every direction. Under the action of an external electric field, the refractive index n(E) of the electro-optical material is a function of the amplitude E of the external electric field, and it changes slightly with the change of E, which can be denoted as:

$$n(E) \approx n - \frac{1}{2}\gamma n^3 E.$$

This effect is referred to as Pockels effect, and these materials are referred to as Pockels media or Pockels cells, and its coefficient is referred to as Pockels coefficient or linear electro-optical coefficient. Any polarized light can be decomposed into two orthogonal polarization components. In an anisotropic medium, these two polarization components are generally decomposed into two principal index axes of the refractive index ellipsoid. Assuming that the corresponding refractive indexes of the two polarization components are $n_1$ and $n_2$ respectively, then their propagation speeds are $c_0/n_1$ and $c_0/n_2$ respectively, where $c_0$ is the speed of light wave in vacuum. Due to the difference in the propagation speed of the two components, when one component propagates to the other end of the device, it will lead or lag behind the other polarization component in time, thus forming a phase delay and changing the polarization state of the outgoing light. When an external electric field E is applied to an anisotropic material, for the Pockels effect, when the light passes through a modulator with a length of L, the phase difference between the two polarization components is denoted as:

$$\Gamma = k_0[n_1(E) - n_2(E)]L = k_0(n_1 - n_2)L - \frac{1}{2}k_0(\gamma_1 n_1^3 - \gamma_2 n_2^3)EL.$$

For the transverse modulator with the applied electric field direction perpendicular to the propagation direction of light, its electric field is denoted as E=V/d, where V denotes the applied voltage, and d denotes the distance between the two electrodes. The phase difference can be expressed as:

$$\Gamma = \Gamma_0 - \pi \frac{V}{V_\pi}.$$

where $\Gamma_0 = k_0(n_1 - n_2)L$ denotes the phase difference of the device itself, and the half-wave voltage is denoted as $$V_\pi = \frac{d}{L} \frac{\lambda_0}{\gamma_1 n_1^3 - \gamma_2 n_2^3}.$$

Phase retardation is linearly related to the applied voltage, and when the voltage is $V_\pi$, the phase retardation is $\pi$.

Circularly polarized light is composed of the superposition of two plane polarized lights with the same propagation direction, perpendicular vibration directions, and a constant phase difference of $\varphi=(2\ m\pm\frac{1}{2})\pi$. The polarization directions of the two components are parallel to the two refractive index components of the electro-optical modulator. The right-handed circularly polarized light passes through the electro-optical modulator with an applied voltage equal to half-wave voltage $V_\pi$, the phase delay of $\pi$ is introduced, and the phase difference between the two components changes from $\varphi=(2\ m+\frac{1}{2})\pi$ to $\varphi=[2(m+1)-\frac{1}{2}]\pi$, and then changes to the left-handed circularly polarized light. In the case of the left-handed circularly polarized light, the phase difference between the two components changes from $\varphi=(2\ m-\frac{1}{2})\pi$ to $\varphi=(2\ m+\frac{1}{2})\pi$, and then changes to the right-handed circularly polarized light.

In a microscopic imaging system, the light spot intensity distribution near the focus of the microscope objective lens is usually affected by the polarization state, the shape of input light spot, lens structure and phase plate structure. When using a large numerical aperture microscopic objective lens, according to the vector diffraction theory, the electric field vector distribution near the focus can be expressed as:

$$\vec{E}(r_2, \varphi_2, z_2) =$$

$$iC \int \int_\Omega \sin(\theta) \cdot A_1(\theta, \varphi) \cdot A_2(\theta, \varphi) \cdot \begin{bmatrix} p_x \\ p_y \\ p_z \end{bmatrix} \cdot e^{ikn(z_2\cos\theta + r_2\sin\theta\cos(\varphi - \varphi_2))} d\theta d\varphi;$$

where $\vec{E}(r_2,\varphi_2,z_2)$ denotes the electric field vector at the point $(r_2,\varphi_2,z_2)$; $(r_2,\varphi_2,z_2)$ denotes the cylindrical coordinate distribution of the origin at the focal point; C denotes a normalized constant; $A_1(\theta,\varphi)$ denotes the amplitude function of the input light, which usually can be expressed as 1 or a deformation of the basic Gaussian function, $A_2(\theta,\varphi)$ denotes a 3×3 matrix that represents the structure of the imaging lens, which usually can be expressed as $$\sqrt{\cos\theta} \begin{bmatrix} 1 + (\cos\theta - 1)\cos^2\varphi & (\cos\theta - 1)\cos\varphi\sin\varphi & -\sin\theta\cos\varphi \\ (\cos\theta - 1)\cos\varphi\sin\varphi & 1 + (\cos\theta - 1)\sin^2\varphi & -\sin\theta\sin\varphi \\ \sin\theta\cos\varphi & \sin\theta\sin\varphi & \cos\theta \end{bmatrix},$$

where $[p_x;p_y;p_z]$ denotes a unit matrix vector representing the polarization state of the input light.

In a fluorescent differential microscopic imaging system, phase delay can be introduced to the input light by using a phase plate or a spatial light modulator, thereby changing the energy distribution of the light spot. The distribution of the electric field vector near the focal point can be expressed as:

$$\vec{E}(r_2, \varphi_2, z_2) = iC$$

$$\int \int_\Omega \sin(\theta) \cdot A_1(\theta, \varphi) \cdot A_2(\theta, \varphi) \cdot \begin{bmatrix} p_x \\ p_y \\ p_z \end{bmatrix} \cdot e^{i\Delta\alpha(\theta,\varphi)} e^{ikn(z_2\cos\theta + r_2\sin\theta\cos(\varphi - \varphi_2))} d\theta d\varphi,$$

where $\Delta\alpha(\theta,\varphi)$ denotes the introduced phase delay. Usually, a vortex phase plate with a length of 0 to $2\pi$ is used to generate a hollow light spot, and the phase delay introduced thereby can be expressed as $\Delta\alpha=\varphi$. By substituting the above formula, it can be obtained that when the input lights are left-handed circularly polarized light and right-handed circularly polarized light, the distributions of the light spot in the horizontal plane at the focal point are the solid light spot and the hollow light spot, respectively.

Combining the electro-optical modulation technology and fluorescence differential microscopic imaging technology, the electro-optical modulator is used to realize the rapid conversion of input light between a left-handed circularly polarized light and a right-handed circularly polarized light, after passing through a vortex phase plate or a spatial light modulator, the resulting light spot switches quickly between a solid light spot and a hollow light spot. The images obtained by illuminating the sample to be tested under two modes of the solid light spot and the hollow light spot can be obtained in a short time, thereby greatly reducing the time required for fluorescence differential microscopic imaging.

Compared with the prior art, the present invention has the following beneficial technical effects:
(1) a simple improvement is made on the basis of the conventional fluorescence differential microscopic imaging system, and the system is simple and suitable for all fluorescence differential microscopic imaging systems;
(2) the electro-optical modulation technology is used to realize the fast conversion of the polarization state of the excitation light, which can be realized by controlling the applied voltage of the electro-optical modulator, and the operation is simple and the time required is short; and
(3) the electro-optical modulation technology is used to realize the fast conversion of the polarization state of the excitation light, reduce the time required for the conversion of the excitation light between solid and hollow distribution states, and improve the imaging speed of the fluorescence differential microscopic imaging, so as to achieve real-time imaging.

DETAILED DESCRIPTION OF THE EMBODIMENTS

Many specific details are described in the following description to facilitate a full understanding of the present invention. However, the present invention can also be implemented in other ways different from those described herein. Therefore, the present invention is not limited to the limitations of the specific embodiments disclosed herein below.

Embodiments of the present invention are described in detail below. Examples of the embodiments are shown in the drawings, in which the same or similar numerals throughout represent the same or similar elements or elements with the same or similar functions. The embodiments described below with reference to the accompanying drawings are exemplary and are intended to be used to explain the present invention, but cannot be understood as a limitation of the present invention.

Embodiment 1

Figure 3:
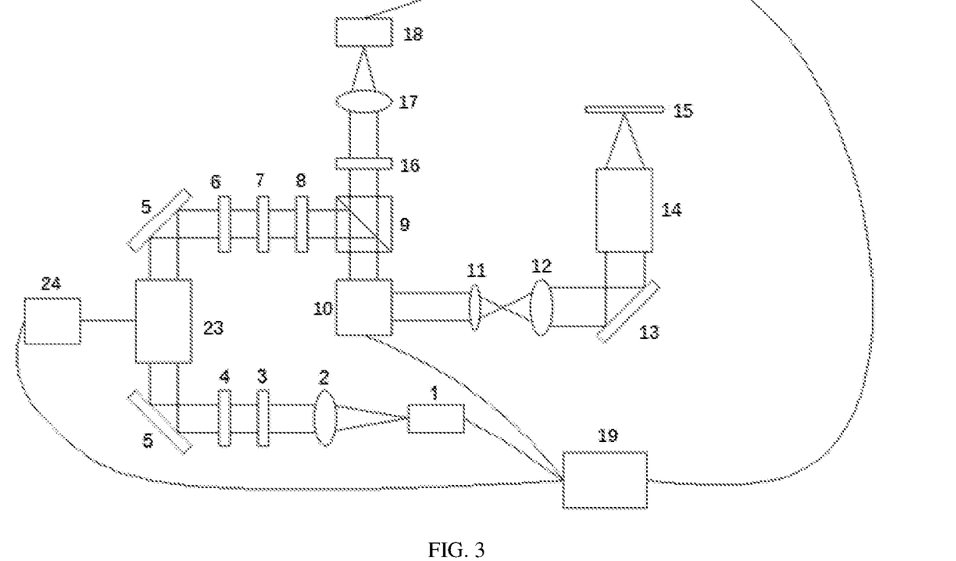
FIG. 3 is an instance diagram of a fluorescent differential microscopic imaging system based on electro-optical modulation technology in the present invention, with a 0-to-2π vortex phase plate 6 used as a phase modulator.

In FIG. 3, a schematic diagram of a fluorescent differential microscopic imaging system based on electro-optical modulation technology and phase modulation of a 0-to-2π vortex phase plate is shown, which includes: a 638 nm laser 1, a collimating lens 2, a polarizing plate 3, a ¼ wave plate 4, a reflector 5, an electro-optical modulator 23, a high-voltage driving module 24, a reflector 5, a 0-to-2π vortex phase plate 6, a ½ wave plate 7, a ¼ wave plate 8, a dichroic mirror 9, a galvanometer scanning system 10, a scanning lens 11, a field mirror 12, a reflector 13, a large numerical aperture objective lens 14, a sample 15, a filter 16, a lens 17, a detector array 18, and a computer 19.

Among these elements, the polarizing plate 3 is used to adjust the polarization state of the excitation light to make an angle of 45° between the polarization direction and the crystal optical axis direction of the electro-optical modulator; the ¼ wave plate 4 is used to adjust the excitation light to circularly polarized light, which is convenient for the modulation of the electro-optical modulator; the 0-to-2π vortex phase plate 6 is used to modulate circularly polarized light into hollow light spot or solid light spot; the ½ wave plate 7 and the ¼ wave plate 8 are used to adjust the polarization state of the modulated excitation light to circularly polarized light; the scanning lens 11 and the field mirror 12 form a 4f system, which is used to match the size of the excitation light beam with the numerical aperture of the objective lens 14, and ensure that there is a parallel light at the entrance pupil of the objective lens; and the pass band of the filter 16 needs to match the fluorescence band of the sample; the driving of galvanometer scanning system 10 needs to match with the driving signal of the electro-optical modulator. For each imaging unit, after obtaining the imaging results under solid and hollow lighting conditions, the galvanometer scanning system is controlled to scan and image the next imaging unit.

The process of realizing fluorescence differential microscopic imaging with the device shown in FIG. 3 is as follows.

(1) The excitation light emitted by the laser 1 is collimated and expanded by the collimating lens 2, and becomes linearly polarized light with an angle of 45° between the polarization direction and the direction of the crystal optical axis of the electro-optical modulator after passing through the polarizing plate 3. The linearly polarized light is adjusted to become circularly polarized light after passing through the ¼ wave plate 4.

(2) The circularly polarized light is reflected by the reflector 5 and then enters the electro-optical modulator 23 for polarization modulation. Under the control of the high-voltage driving module 24, when the driving voltage is 0, the excitation light is right-handed circularly polarized light, and when the driving voltage is the half wave voltage $V_\pi$ of the electro-optical modulator, the excitation light is converted into a left-handed circularly polarized light. With the change of the driving voltage, the excitation light is rapidly converted between a right-handed circularly polarized light and a left-handed circularly polarized light. The electro-optical modulator can work between the resonance frequencies of 0.1-100 MHz, usually with 20 MHz as the working frequency, which can make the excitation light convert 20 times in 1 μs, thus realizing real-time scanning FED imaging.

(3) The circularly polarized light is reflected by the mirror 5 and enters the 0-to-2π vortex phase plate 6 for phase modulation. When the rotation direction of the circularly polarized light is consistent with that of the vortex phase plate, a hollow light spot is obtained; when the rotation direction of the circularly polarized light is inconsistent with that of the vortex phase plate, a solid light spot is obtained. The modulated excitation light passes through ½ wave 7 and ¼ wave plate 8 to compensate for the phase difference caused by the rear dichroic mirror 9, the galvanometer scanning system 10 and the reflector 13 and adjusts to make the modulated excitation light circularly polarized. The excitation light enters the galvanometer scanning system 10 after being reflected by the dichroic mirror 9 to realize two-dimensional scanning on the final sample surface. The excitation light from the galvanometer scanning system 10 passes through the 4f system composed of the scanning lens 11 and the field mirror 12, and the beam size is adjusted to match the numerical aperture size of the objective lens 14. After the excitation light is focused by the objective lens, the excitation spot with diffraction limit is obtained, and the excitation spot is focused on the fluorescent sample 15.

(4) The fast-converted excitation light under the two modes of solid and hollow light spots illuminates the fluorescent sample 15 and then excites the sample to generate fluorescence. The generated fluorescence is collected by the objective lens and then incident on the dichroic mirror 9 after passing through the reflector 13, the field mirror 12, the scanning lens 11, and the galvanometer scanning system 10. The dichroic mirror 9 transmits fluorescence, and the transmitted fluorescence is filtered by the filter 16 to remove the excitation light reflected by the sample and other stray light, and then only the fluorescence is emitted. The emitted fluorescence is focused to the detector array 18 after being focused by the lens 17. The detector array converts the optical signal into an electrical signal and transmits the electrical signal to the computer 19.

(5) The computer 19 performs corresponding image processing on the signal detected by each detector unit in detector array 18 to obtain the imaging results corresponding to one object point in solid or hollow lighting mode. The computer 19 controls electro-optical modulator 23 through high-voltage driving module 24 to realize fast conversion of excitation light in solid and hollow lighting modes. The computer 19 obtains two imaging results corresponding to one object point in two lighting modes, and the final image corresponding to an object point is obtained after subtracting an image result from another one according to a certain proportion.

(6) The galvanometer scanning system 10 is connected to the computer 19, and the computer 19 controls the galvanometer scanning system to scan the sample in two dimensions to obtain the corresponding two-dimensional image of the sample.

Embodiment 2

Figure 4:
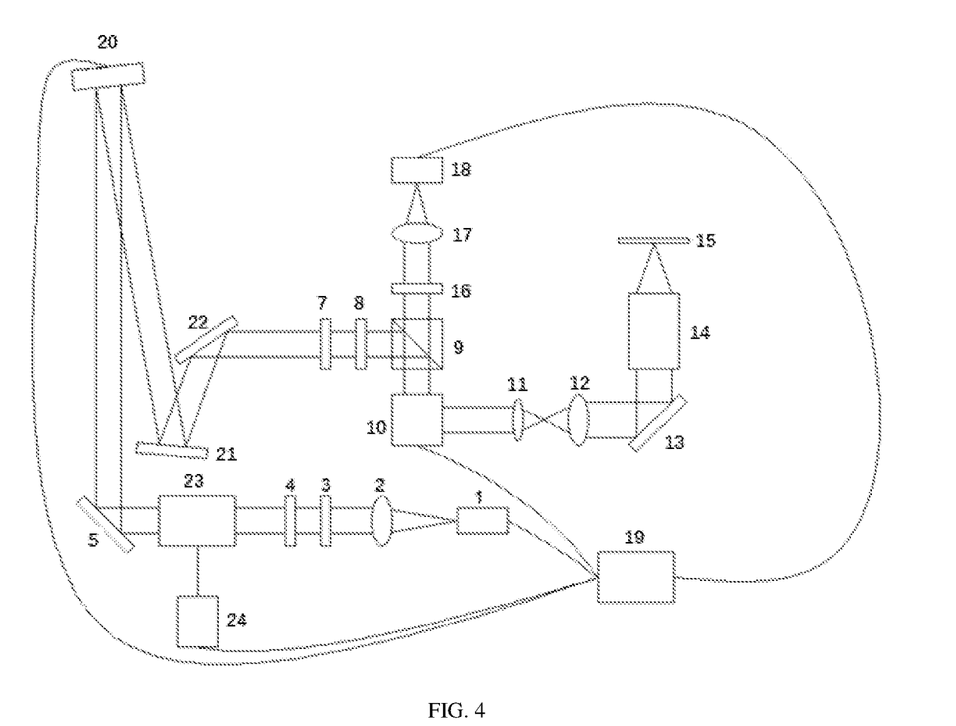
FIG. 4 is an instance diagram of a fluorescent differential microscopic imaging system based on electro-optical modulation technology in the present invention, with a spatial light modulator 20 used as a phase modulator.

In FIG. 4, a schematic diagram of a fluorescent differential microscopic imaging system based on electro-optical modulation technology and phase modulation of a spatial light modulator is shown, which includes: a 638 nm laser 1, a collimating lens 2, a polarizing plate 3, a ¼ wave plate 4, an electro-optical modulator 23, a high-voltage driving module 24, a reflector 5, a 0-to-2π vortex phase plate 6, a ½ wave plate 7, a ¼ wave plate 8, a dichroic mirror 9, a galvanometer scanning system 10, a scanning lens 11, a field mirror 12, a reflector 13, a large numerical aperture objective lens 14, a sample 15, a filter 16, a lens 17, a detector array 18, and a computer 19.

Among these elements, the polarizing plate 3 is used to adjust the polarization state of the excitation light to make an angle of 45° between the polarization direction and the crystal optical axis direction of the electro-optical modulator; the ¼ wave plate 4 is used to adjust the excitation light to circularly polarized light, which is convenient for the modulation of the electro-optical modulator; the spatial light modulator 20 is used to modulate circularly polarized light into a hollow light spot or a solid light spot through a loaded 0-to-2π vortex phase modulation pattern; the reflector 21 and the reflector 22 are used for compressing the optical path; the ½ wave plate 7 and the ¼ wave plate 8 are used to adjust the polarization state of the modulated excitation light to circularly polarized light; the scanning lens 11 and the field mirror 12 form a 4f system, which is used to match the size of the excitation light beam with the numerical aperture of the objective lens 14 and ensure that there is a parallel light at the entrance pupil of the objective lens; the pass band of the filter 16 needs to match the fluorescence band of the sample; the driving of galvanometer scanning system 10 needs to match with the driving signal of electro-optical modulator. For each imaging unit, after obtaining the imaging results under both solid and hollow lighting conditions, the galvanometer scanning system is controlled to scan and image the next imaging unit.

The process of realizing fluorescence differential microscopic imaging with the device shown in FIG. 4 is as follows.

(1) The excitation light emitted by the laser 1 is collimated and expanded by the collimating lens 2, and becomes linearly polarized light with an angle of 45° between the polarization direction and the direction of the crystal optical axis of the electro-optical modulator after passing through the polarizing plate 3. The linearly polarized light is adjusted to become circularly polarized light after passing through the ¼ wave plate 4.

(2) The circularly polarized light enters the electro-optical modulator 23 for polarization modulation. Under the control of the high-voltage driving module 24, when the driving voltage is 0, the excitation light is right-handed circularly polarized light, and when the driving voltage is the half wave voltage $V_\pi$ of the electro-optical modulator, the excitation light is converted into a left-handed circularly polarized light. With the change of the driving voltage, the excitation light is rapidly converted between a right-handed circularly polarized light and a left-handed circularly polarized light.

(3) The circularly polarized light is reflected by the mirror 5 and enters the computer 19 to control the spatial light modulator 20 loaded with a 0-to-$2\pi$ vortex phase modulation pattern for phase modulation. When the rotation direction of the circularly polarized light is consistent with that of the vortex phase modulation pattern, a hollow light spot is obtained; when the rotation direction of the circularly polarized light is inconsistent with that of the vortex phase modulation pattern, a solid light spot is obtained. The modulated excitation light is reflected by the reflective mirror 21 and the reflective mirror 22, and then passes through the ½ wave plate 7 and ¼ wave plate 8 to compensate for the phase difference caused by the reflective mirror 21 and the reflective mirror 22, as well as the rear dichroic mirror 9, the galvanometer scanning system 10 and the dichroic mirror 13, and adjusts to make the modulated excitation light circularly polarized. The excitation light enters the galvanometer scanning system 10 after being reflected by the dichroic mirror 9 to realize two-dimensional scanning on the final sample surface. The excitation light from the galvanometer scanning system 10 passes through the 4f system composed of the scanning lens 11 and the field mirror 12, and the beam size is adjusted to match the numerical aperture size of the objective lens 14. After the excitation light is focused by the objective lens 14, the excitation spot with diffraction limit is obtained, and the excitation spot is focused on the fluorescent sample 15.

(4) The fast converted excitation light under the two modes of solid and hollow light spots illuminates the fluorescent sample 15 and then excites the sample to generate fluorescence. The generated fluorescence is collected by the objective lens 14 and then incident on the dichroic mirror 9 after passing through the reflector 13, the field mirror 12, the scanning lens 11 and the galvanometer scanning system 10. The dichroic mirror 9 transmits fluorescence; and the transmitted fluorescence is filtered by the filter 16 to remove the excitation light reflected by the sample and other stray light, and then only the fluorescence is emitted. The emitted fluorescence is focused to the detector array 18 after being focused by the lens 17. The detector array converts the optical signal into an electrical signal and transmits the electrical signal to the computer 19.

(5) The computer 19 performs corresponding image processing on the signal detected by each detector unit in detector array 18 to obtain the imaging results corresponding to one object point in solid or hollow lighting mode. The computer 19 controls electro-optical modulator 23 through high-voltage driving module 24 to realize fast conversion of excitation light in solid and hollow lighting modes. The computer 19 obtains two imaging results corresponding to one object point in two lighting modes, and the final image corresponding to an object point is obtained after subtracting an image result from another one according to a certain proportion.

(6) The galvanometer scanning system 10 is connected to computer 19, and the computer controls the galvanometer scanning system to scan the sample in two dimensions to obtain the corresponding two-dimensional image of the sample.

Figure 5:
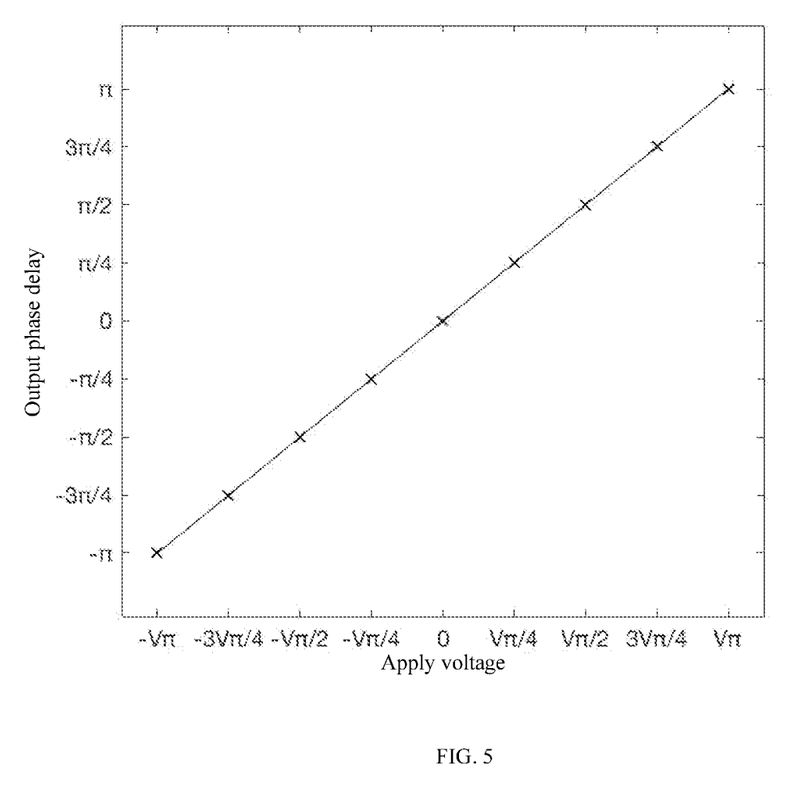
FIG. 5 is a schematic diagram of the polarization modulation of the input light by the electro-optical modulator used in the present invention, illustrating the change of the phase delay introduced between two polarization states of the input light with the applied voltage.

As shown in FIG. 5, different driving voltages of the electro-optical modulator will introduce different phase delays between the two polarization states of the input light. For right-handed circularly polarized light, when the driving voltage of the electro-optical modulator is the half wave voltage $V_\pi$ of the electro-optical modulator, a phase delay of $\pi$ will be introduced between the two polarization states of the input light, and the right-handed circularly polarized light will be converted into left-handed circularly polarized light. When the driving voltage is 0, the phase delay between the two polarization states of the input light is 0, and still right-handed circularly polarized light remains unchanged. By applying a high-frequency pulse voltage with an interval of $V_\pi$, the beam can quickly switch between the two states of left-handed circularly polarized light and right-handed circularly polarized light.

Figure 6:
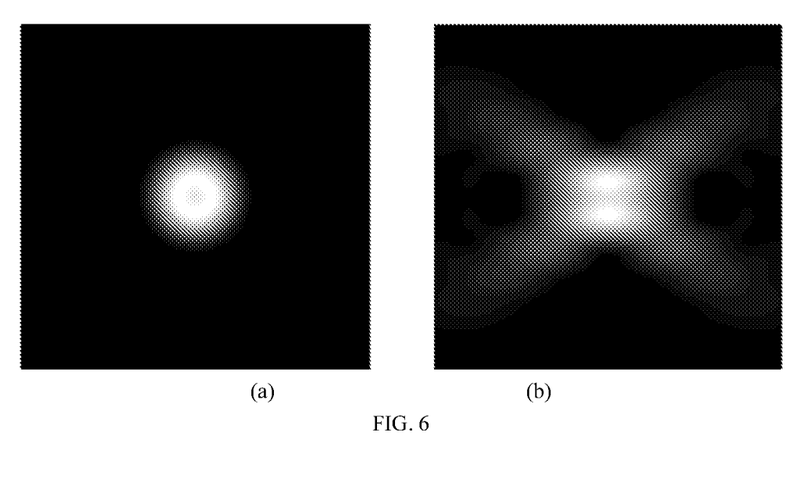
FIG. 6 is a schematic diagram of the light spot intensity distribution obtained with right-handed 0-to-2π phase modulation when the input light is left-handed circularly polarized light, where (a) is a schematic diagram of light spot distribution on the horizontal plane, and (b) is a schematic diagram of light spot distribution on the longitudinal plane.

As shown in FIG. 6, when the input light is left-handed circularly polarized light, the solid light spot is obtained after the right-handed 0-to-$2\pi$ vortex phase modulation. The specific distribution of the solid light spot near the focus of the optical system is calculated according to the vector diffraction theory. The distribution of the solid light spot in the horizontal plane is shown in FIG. 6(*a*), and the distribution in the longitudinal plane is shown in FIG. 6(*b*).

Figure 7:
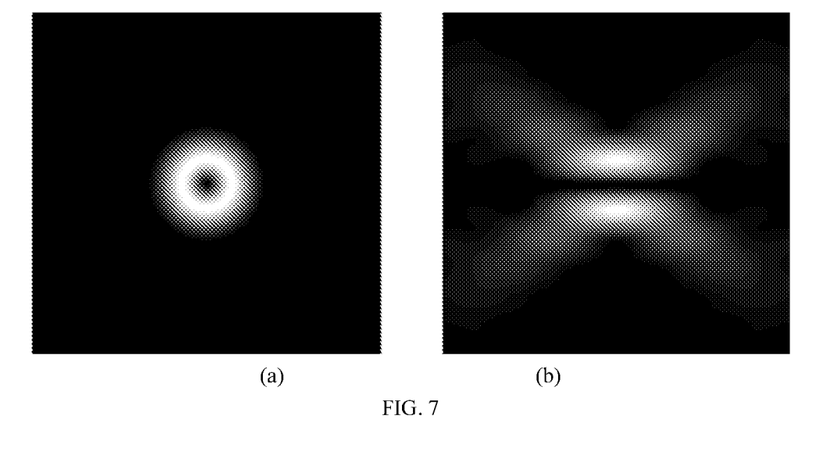
FIG. 7 is a schematic diagram of the light spot intensity distribution obtained with right-handed 0-to-2π phase modulation when the input light is right-handed circularly polarized light, where (a) is a schematic diagram of light spot distribution on the horizontal plane, and (b) is a schematic diagram of light spot distribution the longitudinal plane.

As shown in FIG. 7, when the input light is right-handed circularly polarized light, the hollow light spot is obtained after the right-handed 0-to-$2\pi$ vortex phase modulation. The specific distribution of the hollow light spot near the focus of the optical system is calculated according to the vector diffraction theory. The distribution of the hollow light spot in the horizontal plane is shown in FIG. 7(*a*), and the distribution in the longitudinal plane is shown in FIG. 7(*b*).

Figure 8:
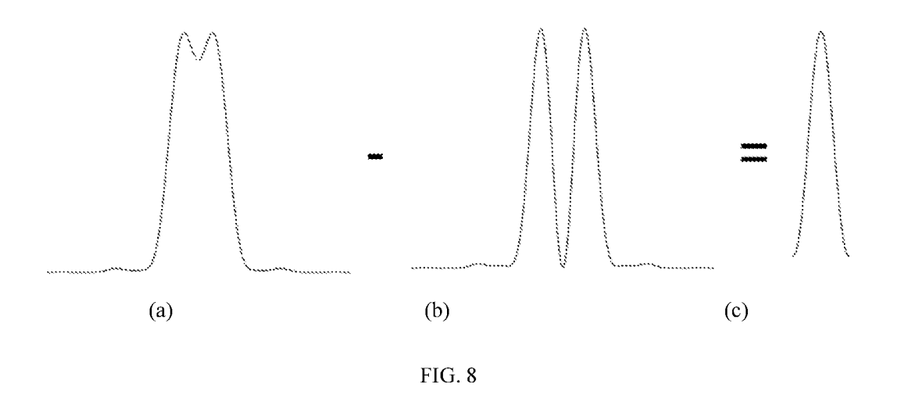
FIG. 8 is a schematic diagram of the process of obtaining a smaller solid point spread function by subtracting the point spread function obtained by hollow light spot illumination from the point spread function obtained by solid light spot illumination in fluorescence differential microscopic imaging, where (a) is a schematic diagram of the point spread function obtained by solid light spot illumination; (b) is the schematic diagram of point spread function obtained by hollow light spot illumination; and (c) is the schematic diagram of point spread function with smaller half height and full width after subtraction.

In FIG. 8, the process of subtracting the hollow point diffusion function from the solid point diffusion function to obtain a smaller solid point diffusion function is shown. As shown in FIG. 8(*a*), the solid spot diffusion function of a fluorescent sample excited by a solid spot is obtained with left-handed circularly polarized light passing through the right-handed 0-to-$2\pi$ vortex phase modulation. As shown in FIG. 8(*b*), the hollow spot diffusion function of a fluorescent sample excited by a hollow spot is obtained with right-handed circularly polarized light passing through the right-handed 0-to-$2\pi$ vortex phase modulation. As shown in FIG. 8(*c*), the final imaging result is obtained by subtracting a fluorescent signal from another one, and the solid point diffusion function with smaller FWHM (full width at half maximum) is obtained by subtracting the solid point diffusion function from the hollow point diffusion function.

The above contents are merely better embodiments of the present application and are not used to limit the present invention. Any modifications, equivalent replacements, improvements and the like made within the spirit and principle of the present invention shall be included in the protection scope of the present invention.

The invention claimed is:

1. A phase-modulated fluorescence differential microscopic imaging device based on electro-optical modulation technology, comprising an illumination system for generating an excitation beam, a detection system for collecting a fluorescent signal emitted by a sample, and a computer for controlling and signal processing, wherein the illumination system comprises the following components that are sequentially arranged:

a laser, emitting a laser beam;

an electro-optical modulation module, configured to control a rapid conversion of the laser beam between a right-handed circularly polarized light and a left-handed circularly polarized light; and a phase modulation device, configured to phase-modulate a circularly polarized light to form a solid light spot and a hollow light spot for illuminating the sample and exciting fluorescence.

2. The phase-modulated fluorescence differential microscopic imaging device based on electro-optical modulation technology according to claim 1, wherein the electro-optical modulation module comprises an electro-optical modulator for modulating a polarization state of an excitation light and a high-voltage driving module for controlling the electro-optical modulator, and the high-voltage driving module is controlled by the computer.

3. The phase-modulated fluorescence differential microscopic imaging device based on electro-optical modulation technology according to claim 2, wherein a polarizing plate for adjusting the excitation light to make an angle of 45° with the direction of a crystal optical axis of the electro-optical modulator and a ¼ wave plate for modulating an amplitude state of the excitation light are provided between the laser and the electro-optical modulation module, and the adjusted laser beam is a right-handed circularly polarized light.

4. The phase-modulated fluorescence differential microscopic imaging device based on electro-optical modulation technology according to claim 3, wherein in case that a beam passes through the electro-optical modulator, the polarization state of the beam does not change when the electro-optical modulator does not apply a control voltage, and the beam is converted into a left-handed circularly polarized light when the electro-optical modulator applies a voltage equal to a half wave voltage $V_\pi$ of the electro-optical modulator, and the rapid conversion of the beam between right-handed circularly polarized light and left-handed circularly polarized light is capable of being achieved by applying a high-frequency pulse voltage $V_\pi$ with a certain interval.

5. The phase-modulated fluorescence differential microscopic imaging device based on electro-optical modulation technology according to claim 1, wherein the phase modulation device is a 0-to-$2\pi$ vortex phase plate.

6. The phase-modulated fluorescence differential microscopic imaging device based on electro-optical modulation technology according to claim 1, wherein the phase modulation device is a spatial light modulator loaded with a 0-to-$2\pi$ vortex phase modulation pattern.

7. A phase-modulated fluorescence differential microscopic imaging method based on electro-optical modulation technology, according to the phase-modulated fluorescence differential microscopic imaging device in claim 1, wherein the method comprises:

adjusting a laser beam emitted by a laser to a right-handed circularly polarized light after collimating the laser beam;

controlling a rapid conversion of the laser beam between a right-handed circularly polarized light and a left-handed circularly polarized light through an electro-optical modulation module;

phase-modulating a circularly polarized light to form a solid light spot and a hollow light spot for illuminating a sample and exciting fluorescence; and collecting a fluorescent signal to obtain images of the solid light spot and the hollow light spot respectively, and obtaining a microscopic imaging result after differential processing.

8. The phase-modulated fluorescence differential microscopic imaging method based on electro-optical modulation technology according to claim 1, wherein the electro-optical modulation module comprises an electro-optical modulator for modulating a polarization state of an excitation light and a high-voltage driving module for controlling the electro-optical modulator, and the high-voltage driving module is controlled by the computer.

9. The phase-modulated fluorescence differential microscopic imaging method based on electro-optical modulation technology according to claim 8, wherein in case that the beam passes through the electro-optical modulator, the polarization state of the beam does not change when the electro-optical modulator does not apply a control voltage, and the beam is converted into left-handed circularly polarized light when the electro-optical modulator applies a voltage equal to a half wave voltage $V_\pi$ of the electro-optical modulator, and the rapid conversion of the beam between right-handed circularly polarized light and left-handed circularly polarized light is able to be achieved by applying a high-frequency pulse voltage $V_\pi$ with a certain interval.

10. The phase-modulated fluorescence differential microscopic imaging method based on electro-optical modulation technology according to claim 1, wherein the phase modulation device is used to phase-modulate the circularly polarized light, and the phase modulation device is a 0-to-$2\pi$ vortex phase plate or a spatial light modulator loaded with a 0-to-$2\pi$ vortex phase modulation pattern.

* * * * *